March 4, 1969   C. B. ROGERS   3,430,780
INFLATABLE MATERIAL MOVING DEVICE
Filed June 28, 1967   Sheet 1 of 2

INVENTOR
CYRIL B. ROGERS
BY Kenneth C. Witt
ATTORNEY

March 4, 1969 C. B. ROGERS 3,430,780
INFLATABLE MATERIAL MOVING DEVICE
Filed June 28, 1967 Sheet 2 of 2

INVENTOR
CYRIL B. ROGERS
BY Kenneth C. Witt
ATTORNEY

United States Patent Office 3,430,780
Patented Mar. 4, 1969

3,430,780
INFLATABLE MATERIAL MOVING DEVICE
Cyril B. Rogers, Niles, Mich., assignor to Clark
Equipment Company, a corporation of Michigan
Filed June 28, 1967, Ser. No. 649,560
U.S. Cl. 214—1                                    1 Claim
Int. Cl. B65g 7/06

ABSTRACT OF THE DISCLOSURE

An inflatable device is inserted beneath material to be moved, and inflated to lift the material off the surface on which it is supported, after which the material may be slid along the upper surface of the device. The device may be provided with lubricating means on the upper surface such as an air film discharged from openings in the upper surface. The inflatable device may be made contractible into a compact bundle.

Background of the invention

The present invention was conceived particularly with a view to the loading and unloading of cargo aircraft although it is not limited to such use.

It is known that it is desirable to minimize as much as possible the auxiliary equipment and devices that must be installed in cargo aircraft to load and unload the cargo therefrom because the weight of such auxiliary apparatus and devices cuts down the payload which the aircraft can transport. It is also important to utilize most efficiently the volumetric capacity of a cargo aircraft and thus to minimize the use of auxiliary apparatus and devices which will interfere with the maximum utilization of the full interior space. The time of loading and unloading of such aircraft also is of great importance, and it is desired to have methods and devices which will accomplish loading and unloading quickly and with a minimum of manpower.

It will be apparent from the following description that the present invention fulfills these needs, and further that it can be used in other situations than cargo aircraft where similar needs are present.

Summary of the invention

The inflatable device of this invention is arranged to be inserted beneath the material to be moved. It is then inflated, and after inflation it has a relatively flat upper surface. Inflating the device lifts the material off the surface on which it is supported, and the material may then be slid along the upper surface of the device which is provided with an air film as a lubricant.

Brief description of the drawing

The numeral 10 in the various figures of the drawing dfesignataes generally an inflatable device constructed in accordance with the present invention. It is shown in FIG. 1 being utilized in the moving of material while FIG. 2 shows the manner in which the typical device illustrated, when not inflated, may be coiled up into a compact roll to make it readily portable. FIG. 3 shows a cross-sectional view of the device which depicts more of the details, and the inflatable device will be described initially with reference particularly to FIG. 3 but with reference to the other figures of the drawing also as needed.

As illustrated in FIG. 3, the inflatable device includes a pair of parallel tubular portions 12 and 14 along each side which may be made of rubber or other equivalent material. As shown, these are provided with extra wear portions 16 and 18 respectively, secured to the outer surfaces of the tubular members. Between the tubular members 12 and 14 are secured a pair of flat flexible members. The upper member is indicated by the numeral 20 and the lower member by the numeral 22. These two portions are sealed along both sides of the elongated inflatable device to the tubes 12 and 14 respectively, and they are also restrained from expanding farther apart than a desired predetermined distance by means of a large number of threadlike elements 24 which are secured between portions 20 and 22. These threads permit the upper and lower surface portions to collapse toward each other but they will not permit them to expand a greater distance apart than indicated in FIG. 3. The ends of device 10 are, of course, sealed to provide an air tight chamber which is indicated generally by the numeral 11.

Figure 1:
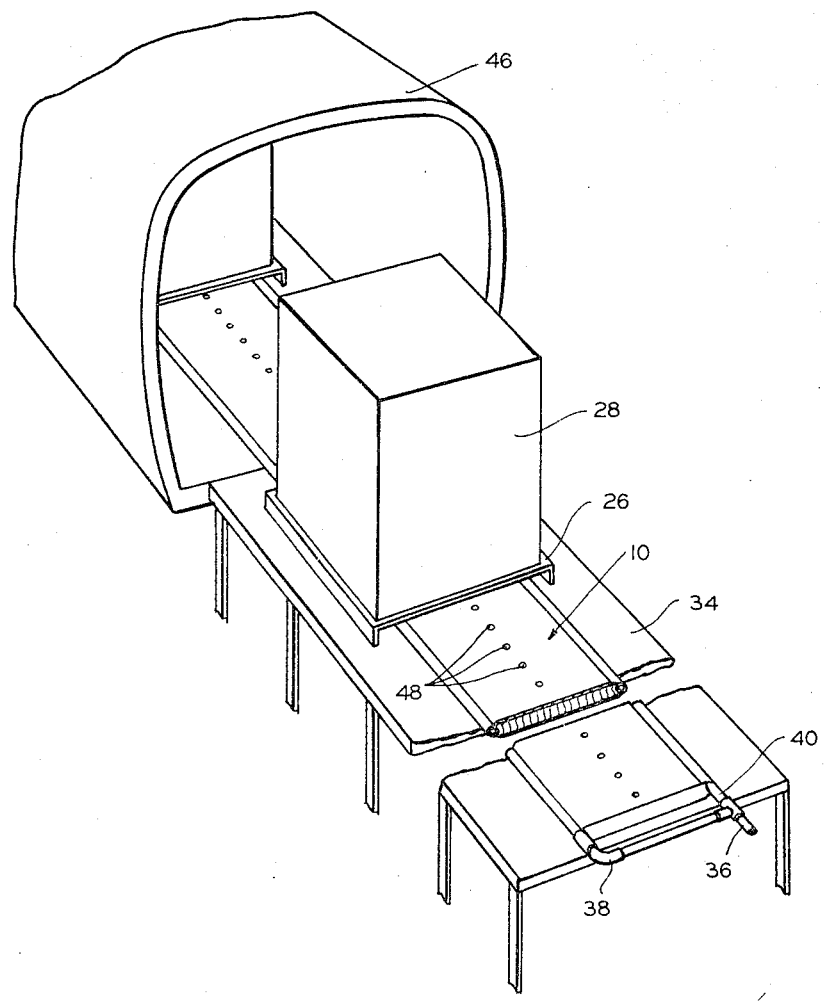
FIGURE 1 shows a schematic perspective view of the device of my invention.
Figure 3:
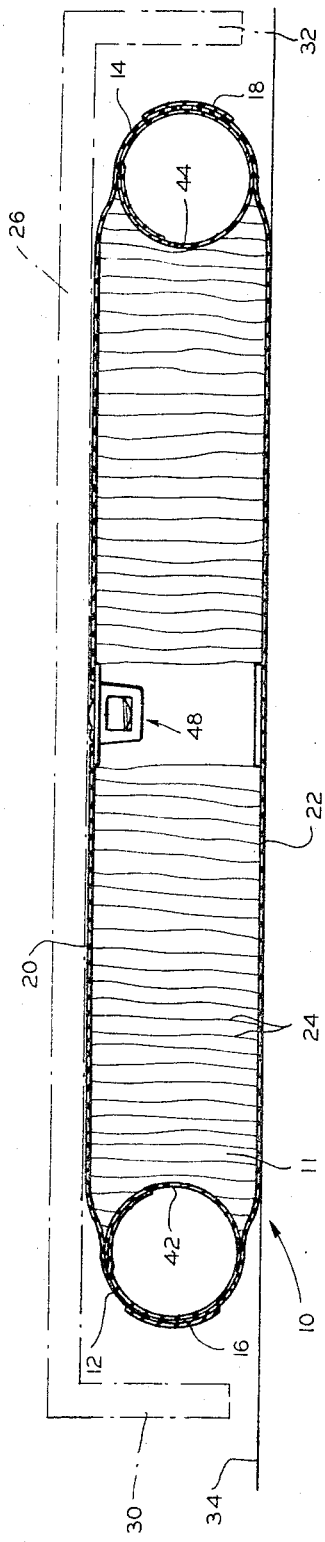
FIGURE 3 shows an enlarged cross-sectional view through the inflatable device.

The device 10 is shown in FIG. 1 supporting a pallet with a load of material thereon, which pallet load of material can be moved along the inflatable device with a small amount of horizontal force. The pallet is indicated by the numeral 26 in FIG. 1 and the load of material thereon by the numeral 28. The pallet 26 also is shown in FIG. 3 in dashed lines, and it will be observed that it is provided with depending portions 30 and 32 along the respective sides. When the device 10 is in the inflated condition illustrated in the drawing it holds the pallet 26 up off the surface indicated by the numeral 34 in FIGS. 1 and 3, so that the material may be moved readily along the inflatable device 10.

The device 10 is inflated by inserting air under pressure at the inlet indicated by the numeral 36 in FIG. 1 from which it flows through connection 38 to the left side tube 12 of the device and through connection 40 to the right side tube 14 of the inflatable device. From these tubes it flows through openings 42 and 44 respectively, illustrated in FIG. 3, into the interior of the device to expand surfaces 20 and 22 into the configuration illustrated in FIG. 3.

The method of my invention is illustrated in FIG. 1 which shows schematically the loading or unloading of cargo from a vehicle 46 which may be a cargo aircraft. The inflatable device 10 may be in the condition illustrated in FIG. 2 initially. It is then unrolled and in its uninflated condition is pulled beneath the material which is to be moved. It will be appreciated that the pallets upon which the material rests must be provided with depending edges such as 30 and 32 of pallet 26, or in some equivalent manner a space must be provided through which the inflatable device may be inserted beneath the cargo.

Then, the device 10 is inflated and assumes the position illustrated in FIG. 3, raising the pallet and its load off the surface upon which it was resting. In the form of the invention illustrated, this causes a ball check valve 48 to open to release a film of superatmospheric air beneath the load. Actually several of these may be depressed depending on the longitudinal extent of the load. Also, there may be more than one row of ball check valves, depending on the width of the load.

Figure 4:
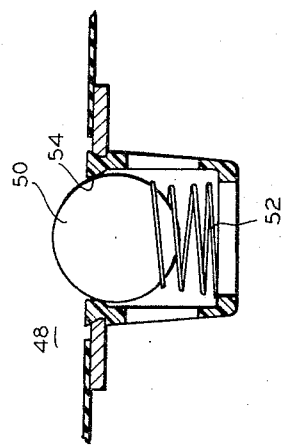
FIGURE 4 shows a cross-sectional view of one of the ball check valves installed in the upper surface of the inflatable device.

Ball check valve 48 is illustrated in greater detail in FIG. 4, and includes a ball 50 which is normally forced by a spring 52 against a circular seat 54 to provide a seal which prevents the escape of air from within device 10. However, when the ball 50 is depressed as illustrated in FIG. 3, air then escapes around the ball 50 between the ball and seat 54. This provides a film of air beneath the load which acts as a lubricant and makes it possible readily to push the load along the device 10 with little effort. For a more detailed explanation of the principle upon which this invention operates when air is used as a lubricant, reference is made to Patent Re. 25,045, although in such patent the floor is rigid and the pallet has a flexible surface whereas the reverse is true in the present method and device.

Figure 2:
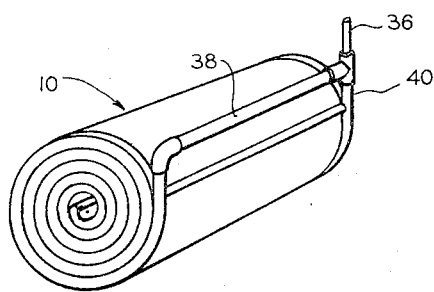
FIGURE 2 shows the device in coiled condition.

Moreover, it should be understood that this invention is not limited to the use of an air lubricant on the upper surface as other gases can be used. It is possible to provide sufficiently low friction on such surface also by the use of other separate lubricating means such as a liquid, or by using a low friction material on the upper surface of the device such as Teflon, for example. It will be understood that the device 10 need not necessarily be coilable as illustrated in FIG. 2 but may be foldable or otherwise compressible or contractible into a compact bundle.

Therefore, while I have described and illustrated my invention herein in a preferred form in accordance with the statute, it should be understood that it is not limited to such preferred form and modifications may be made.

I claim:

1. A material handling device comprising a pair of flexible tubes arranged in parallel relation, a pair of flat flexible members sealed to said tubes along both edges of the said flexible members and forming upper and lower surfaces of an elongated inflatable chamber, means connecting the flat flexible members internally of the chamber, and means for inflating the said chamber comprising openings in both of the said tubes connecting such tubes with the chamber, air connections for inflating the device through the said tubes and the said openings, and a plurality of check valves in the said upper surface arranged so that when they are depressed air is discharged from the chamber through the said valves.

References Cited

UNITED STATES PATENTS

| | | | |
|---|---|---|---|
| 2,004,095 | 6/1935 | Hankins et al. | 214—38 |
| 2,620,493 | 12/1952 | Brelsford. | |
| 2,892,554 | 6/1959 | Decker | 214—38 |
| 2,936,056 | 5/1960 | Heyniger | 193—25 |
| 3,011,665 | 12/1961 | Wise | 214—38 |
| 3,081,886 | 3/1963 | Flexman et al. | 214—1 |
| 3,084,489 | 4/1963 | Seefluth. | |
| 3,161,247 | 12/1964 | Mackie. | |
| 3,190,460 | 6/1965 | Rubin. | |
| 3,205,106 | 9/1965 | Cross | 161—98 X |
| 3,272,359 | 9/1966 | Thomas et al. | 214—1 |

GERALD M. FORLENZA, *Primary Examiner.*

F. E. WERNER, *Assistant Examiner.*